United States Patent [19]
Daniels

[11] 3,710,224
[45] Jan. 9, 1973

[54] DISPLAY STAND FOR RECHARGEABLE BATTERY OPERATED APPLIANCE

[75] Inventor: John F. Daniels, Bridgeport, Conn.

[73] Assignee: Sperry Rand Corporation, New York, N.Y.

[22] Filed: Dec. 31, 1970

[21] Appl. No.: 103,072

[52] U.S. Cl. .......................... 320/2, 248/13, 339/119
[51] Int. Cl. ............................................. H01m 45/04
[58] Field of Search ...... 320/2; 339/147 P, 31 B, 119, 339/191, 186; 248/13, 310, 37.3

[56] References Cited

UNITED STATES PATENTS

| 3,536,981 | 10/1970 | Locke et al. | 320/2 |
| 3,371,260 | 2/1968 | Jackson et al. | 320/2 |
| 3,369,294 | 2/1968 | Shaw et al. | 320/2 X |
| 3,379,952 | 4/1968 | Tarrson | 320/2 |
| 3,359,635 | 12/1967 | Jepson et al. | 320/2 X |

Primary Examiner—J. D. Miller
Assistant Examiner—Robert J. Hickey
Attorney—Charles R. Miranda and Robert W. Ely

[57] ABSTRACT

A stand for supporting a rechargeable battery operated appliance in a stationary position when the batteries are being recharged which includes a casing upon which the appliance is mounted and a power cord connected to a source of external replenishing power for recharging the batteries. Means are provided on the casing and the power cord for detachably securing a plug portion of the cord to the casing and means are provided on the plug portion of the cord for supporting the appliance in a stationary position on the stand when the cord is attached to the casing.

6 Claims, 6 Drawing Figures

PATENTED JAN 9 1973

INVENTOR.
John F. Daniels
BY
C. R. Miranda
ATTORNEY.

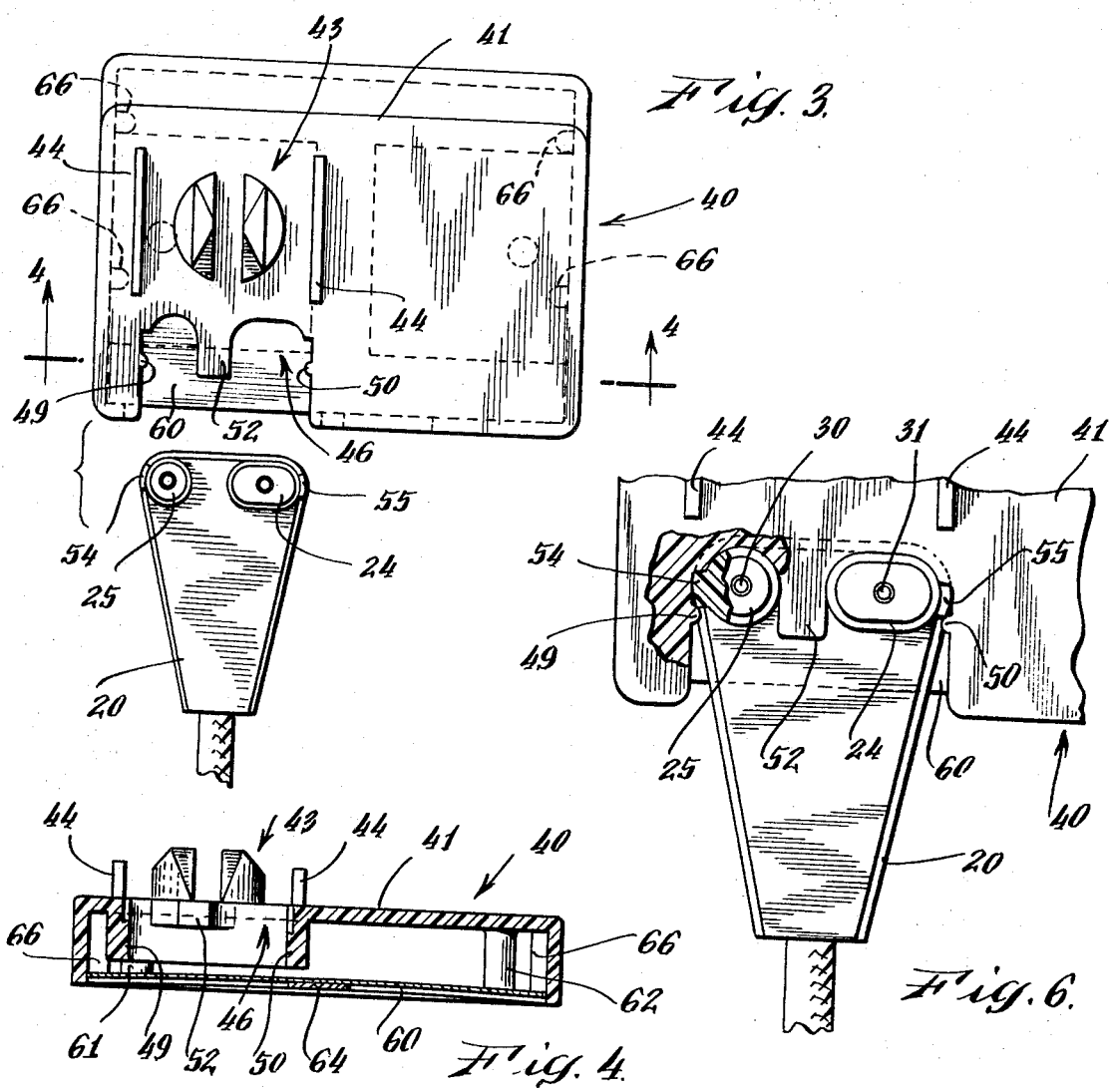

યાર3,710,224

DISPLAY STAND FOR RECHARGEABLE BATTERY OPERATED APPLIANCE

BACKGROUND OF THE INVENTION

This invention is directed to new and useful improvements in stand devices for displaying and supporting rechargeable battery operated appliances during recharging of the batteries.

Rechargeable battery operated appliances such as battery operated knives, power tools, toothbrushes, electric dry shavers and other similar appliances are well-known. These appliances as indicated all include rechargeable batteries which must be periodically connected to an external power source to replenish the power supply of the batteries. The battery operated electric shaver, (for example) includes within the appliance casing a motor, a cutter head, drive means for the cutter head and a rechargeable battery or battery pack for supplying a source of power for operation of the motor for driving the cutter head. These devices also include a charger device such as a step down transformer to reduce the current of the external power source such as the usual household electrical outlet to a suitable low level for charging the low voltage batteries. Certain of the battery operated shavers include within the shaver casing the charging means for the batteries. In this type shaver the latter is connected directly to the power source such as by a power cord when the batteries are to be recharged. In other shavers of this type the charging circuit is arranged within a separate casing or stand upon which the appliance is mounted when it is desired to recharge the batteries. In these latter type arrangements the stand is in turn connected to the external power source by a power cord or other means to charge the batteries within the appliance. In other battery operated devices the charging circuit is contained within a power pack or transformer casing having a "plug-in" connection with the power power outlet. Power cord means are provided for interconnecting the power pack to the shaver casing for charging the batteries.

In all of these mentioned devices it is desirable that in addition to the battery mode of operation that means be provided for operating the shaver independently of the batteries directly from the external power source. This is accomplished in some battery appliances by utilization of a separate cord connection with the power pack and in others through various switching and internal circuits arrangements of both the charger and appliance casing.

It has been found in most instances that it is desirable that a stand or the like be provided to hold the appliance in a stationary position during the recharging cycle of the batteries rather than leaving the appliance unprotected in a position where it is subject to accidental damage. Therefore, various stand devices have been provided upon which the appliance is held in a stationary position during the charging-cycle. The typical stand is provided with contacts within the stand for engaging contacts on the appliance casing in the stationary position to establish a charging circuit from the external source to the batteries. These stands are then easily and conveniently placed on a flat surface such as a counter top or as in some instances provided with means for suspending the same from a wall bracket. Although these devices have proven satisfactory in use certain inconveniences are presented when it is desired to operate the shaver directly from the external source and apart from the charger stand. This has been accomplished in known devices by providing the user with an additional power cord whereby he can connect the appliance directly to the external source or to the external source via a power cord connection with the charger stand. As will be appreciated although these modes of operation are not satisfactory if the user is to travel for example he must take with him or have available when not traveling several power cords and/or a charger stand to insure that he will be able to have the options to obtain direct power operation of the appliance and have the convenience of a stand available when the batteries are recharging.

It is the object of the present invention to provide a novel charger stand for a rechargeable battery operated appliance.

An object of the present invention is to provide a novel arrangement wherein only one appliance power cord is required for both the charging operation and for operating the appliance directly from a power source.

Another object is to provide a novel arrangement for allowing operation of an appliance directly from the power source and for maintaining the same in a stationary position on a stand for recharging the batteries.

A still further object of the invention is to provide a novel charger stand having novel means for connecting thereto a power cord for charging an appliance mounted thereon.

SUMMARY OF THE INVENTION

This invention contemplates a novel charger stand for a rechargeable battery operated appliance. The stand comprises a casing for mounting the appliance thereon in a stationary position. A power cord is provided for connection to an external source of replenishing power and is provided with a plug portion detachably securing the power cord to the stand casing. Means are provided on the cord plug for interconnection with the appliance mounted on the casing for maintaining the appliance thereon. The cord is adapted to be disconnected from the stand whereby it is adapted for connection directly to the appliance for operation thereof or recharging of the batteries independently of the stand.

The above and other objects and advantages of the present invention will appear more fully hereinafter from a consideration of the detailed description which follows taken together with the accompanying drawings wherein one embodiment of the present invention is illustrated.

DESCRIPTION OF THE DRAWINGS

In the drawings:

FIG. 3 is a plan view of the stand of FIG. 2 showing the appliance cord in a disconnected relationship;

FIG. 4 is a sectional view taken on the line 4—4 of FIG. 3;

FIG. 5 is a bottom view of the stand as illustrated in FIG. 3; and

FIG. 6 is an enlarged partially fragmentary plan view of the stand and the power cord in connected relationship.

DETAILED DESCRIPTION

Figure 1:
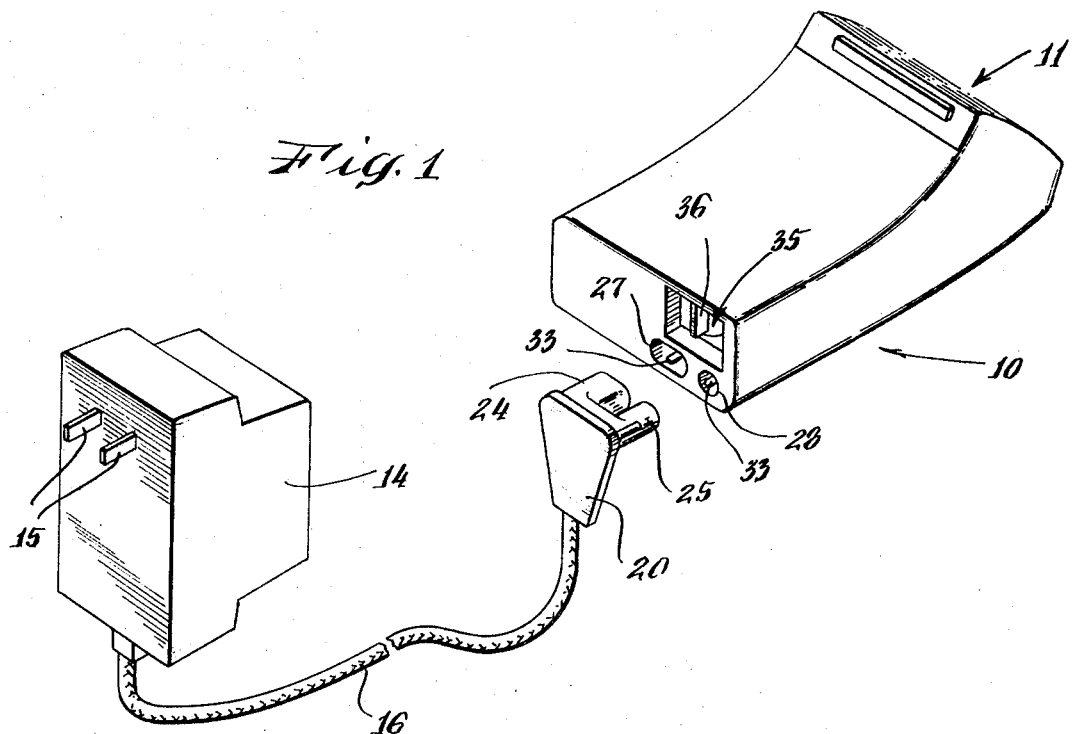
FIG. 1 is a perspective view of a rechargeable battery operated electric shaver, a charger device therefor and an interconnecting power cord therefor.
Figure 2:
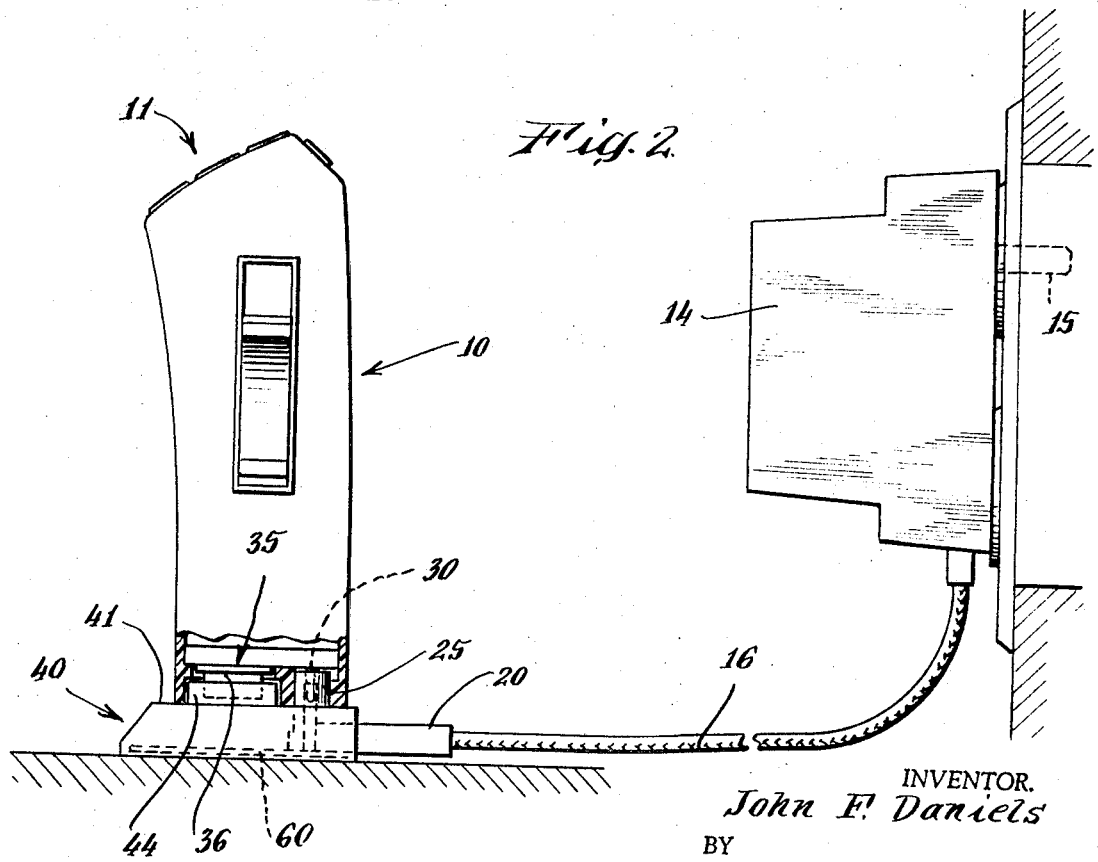
FIG. 2 is a side elevational view of the shaver and charger device of FIG. 1 and shows the appliance mounted on a stand device embodying the present invention.

Referring now to the drawings for a more detailed description of the present invention. An electric dry shaver casing is generally indicated by the reference numeral 10 in FIG. 1 and 2. Electric shaver 10 is of a usual type and includes a cutter head 11 in one end thereof. A motor and a battery (both not shown) for supplying power to the motor for operating cutter head 11 through suitable drive means are arranged within the casing 10 in a usual manner. A power pack casing 14 housing therein suitable means such as a step-down transformer for reducing the current to a suitable low voltage is provided for charging the batteries of the appliance and for operating the appliance motor independently in a known manner. Input prongs 15 extend from power pack casing 14 for connection to the external household outlet (as illustrated in FIG. 2). Charger output means comprise a power cord 16 extending from casing 14.

A plug 20 is provided on the free end of power cord 16 and is formed with a pair of male output connector terminal plugs 24-25 respectively. Male plug terminals 24-25 include outer casings of complementary configuration with input terminal sockets 27-28 provided in the bottom of shaver casing 10. Sleeve contacts 30-31 are provided in plugs 24-25 for connection to input terminal pins 33 in sockets 27-28. An on-off switch 35 having a handle 36 is arranged adjacent input terminal sockets 27 and 28. In this manner with cord 16 connected to shaver 10 and connected to an electrical outlet through prongs 15 power to shaver 10 is introduced in a well-known manner in accordance with the position of switch 35 for either charging the batteries of the appliance or for operating the appliance motor independently of the batteries.

As mentioned it is a feature of the present invention to provide novel means for mounting the appliance on a stand for recharging the batteries in a stationary position other than by a direct cord connection between the appliance and the external power source in a manner mentioned above. To this end a stand 40 is provided. Stand 40 is box-shaped in configuration and made of suitable plastic material. The upper surface 41 (FIG. 3) conforms to the bottom of shaver casing 10 whereby shaver 10 (FIG. 2) is adapted to be placed in a vertical position (FIG. 2) thereon and maintained in position. A pair of cam surfaces 43 are formed in the top surface 41 of stand 40 and are adapted to engage and rotate handle 36 of switch 35 to an open position in a known manner when the shaver 10 is placed thereon to open the battery-motor circuit and prepare a charging circuit to the batteries. Ridges 44 adjacent cams 43 fit within the switch recess to align the shaver thereon.

In order that power may be transmitted from power pack 14 to shaver 10 through cord 16 to recharge, means are provided for receiving and connecting plug 20 of a power cord 16 to stand 40. The latter means include an M-shaped socket recess 46 in wall 41 (FIG. 3). A pair of bosses 49 and 50 are provided on the opposite sidewalls of recess 46 at opposite sides of projecting surface 52 of wall 41.

A resilient metal plate 60 is provided for the base of stand 40 and which plate 60 is secured to stand 40 by means of posts 61 and 62 (FIG. 4) depending from surface 41 and having reduced diameter end portions inserted in apertures in plate 60. Plate 60 is biased in an upward direction toward surface 41 and is maintained in a biased position within stand by tabs 66. A non-slip surface such as cork surface 64 is secured to the outer surface of plate 60.

In accordance with the above description if it is desired to charge batteries of shaver 10 on stand 40, plug 20 of power cord 16 is inserted into recess portion 46 from the position of FIG. 3 to the position shown in FIG. 6. In this manner the under surface of plug 20 rests on plate 60 and male plugs 24 and 25 project upwardly through recess 46 with projecting surface 52 positioned between the plugs 24-25. Main plug 20 is formed with spaced ribs 54-55 maintained in position in stand recess 46 by latching engagement with bosses 49-50. Further the slight upward biasing of bottom plate 60 adds to the effective connected engagement of plug 20 with stand 40.

With plug 20 connected to stand 40 in this manner shaver 10 is placed on stand 40 in mounted position. Input socket terminals 27-28 fit over male plugs 24-25 to establish the charging circuit from power pack to shaver 10. The close fit of plug 24-25 with the walls of input recesses 27-28 of shaver 10 insure a firm grip and positioning of shaver 10 on stand 40.

If it is desired to operate shaver independently of stand 40 or to charge the batteries apart from stand 40 then shaver 10 is removed from stand 40 and plug 20 withdrawn from recess 46. In this manner plug 20 can be connected directly to shaver 10 without connection to the stand.

It will be apparent from the foregoing description that the novel stand and charger arrangement has many advantages in use. Among other advantages the stand is provided with a ready disconnectable cord connection with the power pack means and does not have any charging elements contained within the stand. In this manner the same cord can be utilized for either charging the shaver directly to the power pack or for operating the motor from the external source.

Although one embodiment of the present invention has been illustrated and described in detail it is to be expressly understood that the invention is not limited thereto. Various changes can be made in the design and arrangement of parts without departing from the spirit and scope of the invention as the same will now be understood by those skilled in the art.

What is claimed is:

1. A stand and power cord means for a rechargeable battery operated appliance comprising,
  a. a casing for mounting the appliance in a stationary position during recharging of the batteries of the appliance, the casing having a top wall and a side wall and a recess therein including horizontally and vertically extending recess portions respectively formed in the side and top walls,
  b. power cord means having a first portion and a second portion, said first portion including a plug portion adapted for electrical connection to said appliance apart from said casing and horizontal insertion into said recess, and said second portion including power pack means adapted for electrical connection to an external source of power, c. complementary detent means formed on a wall of the recess of said casing and on said first portion of said cord means for detachably connecting said first portion of said cord means within said recess so as to prevent vertical movement thereoutof, and
d. said first portion of said cord means including means for positioning the appliance on the casing and supporting said appliance in the stationary position.

2. The appliance of claim 1 wherein said detent means include bosses adapted to engage adjacent portions of said plug portion in connected position thereof to said casing.

3. The appliance of claim 1 wherein said positioning and supporting means comprise projecting male output plug terminal portions adapted for engagement in complementary input recess portions of the appliance.

4. The appliance of claim 1 including said top wall adapted to receive thereupon the base of the appliance, said plug portion including output terminals adapted to be inserted into said recess to vertically orient said output terminals, and said supporting means comprising the vertically oriented output terminals on said plug portion.

5. The appliance of claim 1 including said casing comprising a resilient bottom wall, and said bottom wall biased into engagement with the base of said first portion upon insertion of said first portion into said recess.

6. A supporting stand and power pack apparatus for rechargeable battery operated appliance, comprising,
a. a first casing housing said power pack,
b. a second casing for mounting the appliance thereon in a stationary battery charging position,
c. power conducting means extending from said first casing, said power conducting means comprising a cord member having one end secured to said power pack and a plug portion on the opposite end of said cord detachably secured to said second casing,
d. means on said second casing for detachably receiving the plug portion of said power conducting means therein to secure the latter to said second casing, said receiving means including an open-ended horizontally and vertically extending recess provided in the second casing, said plug portion horizontally insertable into said recess, detent means extending from a wall of the recess for engaging the plug portion so as to prevent vertical movement out of the recess, and
e. means on the said plug portion of the power conducting means detachably connectable to the appliance for mounting and positioning the latter in the stationary position on the second casing and for transmitting power from said power pack through said power conducting means to said appliance.

* * * * *